Patented May 18, 1954

2,678,931

UNITED STATES PATENT OFFICE 2,678,931

DISUBSTITUTED OCTAHYDRONAPHTHALENE-1,2-DICARBOXYLIC ACID

John A. Hogg and Frank H. Lincoln, Jr., Kalamazoo, Mich., assignors to The Upjohn Company, Kalamazoo, Mich., a corporation of Michigan No Drawing. Application March 30, 1951, Serial No. 218,536

9 Claims. (Cl. 260—346.6)

This invention relates to certain 6-alkoxy-8a-methyl-octahydronaphthalene 1,2-dicarboxylic acids and to a method for their preparation.

The compounds of the present invention are represented by the general formula:

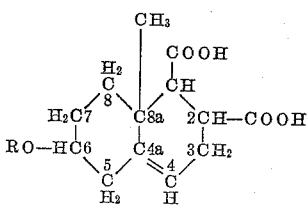

wherein R represents an alkyl group containing up to and including eight carbon atoms. They are usually well-defined crystalline solids that are slightly soluble in cold water, soluble in methanol, hot water, acetone, chloroform, and the like, and insoluble in petroleum hydrocarbon solvents.

The compounds of the present invention are useful in the preparation of steroid hormones, particularly steroid derivatives which have an oxygen attached to carbon atom eleven, and in the preparation of linear polymers and plasticizers.

The compounds of the present invention can be prepared by heating maleic anhydride with a 1-methyl-2-vinyl-4-lower alkoxy-cyclohexene-1 in the presence of an inert solvent and a polymerization inhibitor at a temperature between approximately 80 and approximately 100 degrees centigrade for a period between approximately 12 and approximately 24 hours, to form an anhydride which then can be hydrolyzed to the dibasic acid by conventional procedures, such as by saponification with dilute aqueous potassium hydroxide followed by acidification. The dibasic acids thus formed can be isolated by evaporating the solvent at a subatmospheric pressure and crystallizing the residue from a mixture of hot water and ethanol.

Among the polymerization inhibitors which can be used in the preparation of the compounds of the present invention are hydroquinone, tertiary-butylresorcinol, picric acid and the like.

The 1-methyl-2-vinyl-4-lower alkoxy-cyclohexenes which are used as starting materials in the process of the present invention can be prepared as described and claimed in the copending application of John A. Hogg, et al., Serial No. 199,777 filed October 5, 1949, now Patent No. 2,644,012. As described in the said copending application, a 1-methyl-2-vinyl-4-lower alkoxy-cyclohexene-1 is prepared by starting with a para-lower alkoxyphenol (monoalkyl ether of hydroquinone) having the formula:

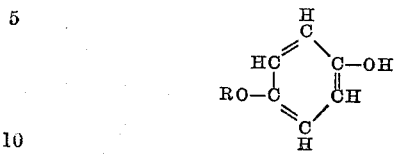

wherein R is an aliphatic hydrocarbon radical as specified in the foregoing definition of R. Such para-alkoxyphenols react readily with three molecules of hydrogen in the presence of a nickel catalyst at temperatures between approximately 130 and approximately 300 degrees centigrade to yield the corresponding saturated compounds, para-hydrocarbonoxycyclohexanols having the formula:

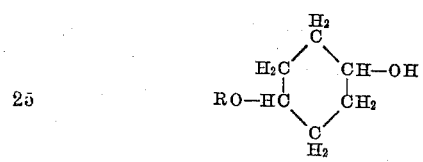

which can be oxidized to para-hydrocarbonoxycyclohexanones having the formula:

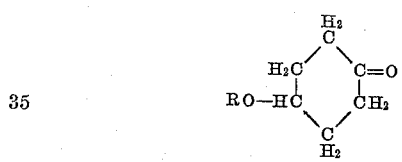

wherein R has the significance hereinbefore assigned, by the use of potassium dichromate and sulfuric acid [Helfer, Helv. Chim. Acta, 7, 953 (1924)].

The resulting para-hydrocarbonoxycyclohexanone is then converted, via a Claisen reaction using diethyl oxalate and sodium ethoxide, into a 2-ethoxalyl-4-hydrocarbonoxycyclohexanone having the formula:

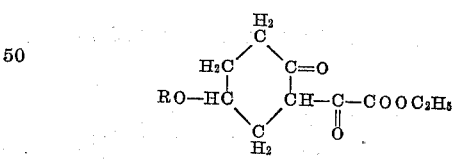

which is readily converted by means of heat and powdered soft glass into a 2-carbethoxy-4-hydrocarbonoxycyclohexanone having the formula:

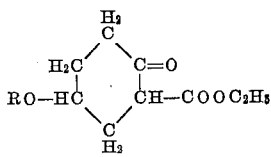

wherein R has the significance hereinbefore assigned.

The resulting 2-carbethoxy-4-hydrocarbonoxycyclohexanone is condensed in the presence of metallic sodium or potassium with a halogen-substituted tertiary amine having the formula:

$$X-CH_2CH_2-NR_2$$

wherein X is halogen, e. g., chlorine or bromine, and each R is a hydrocarbon radical having the significance hereinbefore assigned. The R's may be the same or different from that of the hydrocarbonoxy group. β-Diethylaminoethylchloride is a typical example of such a halogen-substituted amine. The reaction is conducted in an inert organic solvent, such as benzene, toluene or xylene, at a temperature between approximately 80 and approximately 140 degrees centigrade, and preferably at about the reflux temperature of the solvent employed. The reaction is complete in from 10 to 20 hours, at the end of which time the product, a 2-carbethoxy-2-(β-disubstituted aminoethyl)-4-hydrocarbonoxycyclohexanone having the formula:

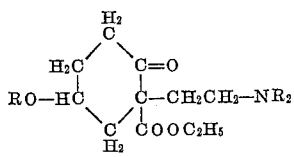

wherein R has the significance hereinbefore assigned, may be isolated in conventional manner, such as by extraction from the organic layer with dilute acid, e. g., hydrochloric and sulfuric acids, and subsequent neutralization with alkali, e. g., potassium carbonate or sodium hydroxide. The crude product is then extracted with a solvent such as ether or benzene and isolated by evaporation of the solvent.

The 2-carbethoxy-2-(β-disubstituted aminoethyl)-4-hydrocarbonoxycyclohexanone thus obtained is then decarbalkoxylated, as with a hydrochloric or sulfuric acid having a concentration between approximately 10 and approximately 20 percent, by heating at a temperature between approximately 80 and approximately 110 degrees centigrade, preferably at about reflux temperature, over a period of from approximately 10 to approximately 20 hours, or, alternatively, with barium hydroxide in alcohol, to produce a 2-(β-disubstituted aminoethyl)-4-hydrocarbonoxycyclohexanone of the formula:

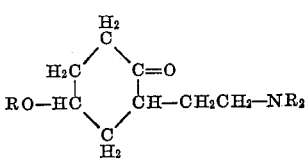

wherein the R's have the significance assigned hereinbefore. After decarbalkoxylation, the product is isolated in conventional manner, as by evaporation of the aqueous acid hydrolyzing medium under subatmospheric pressure, followed by dilution with water and subsequent treatment with alkali, extraction with ether, and distillation.

The 2-(β-disubstituted aminoethyl)-4-hydrocarbonoxycyclohexanone is then treated with methyl lithium in an organic solvent such as diethyl ether, tetrahydrofuran or N-methylmorpholine to produce, after hydrolysis of the intermediate addition product, a 1-methyl-2-(β-disubstituted aminoethyl)-4-hydrocarbonoxycyclohexanol having the formula:

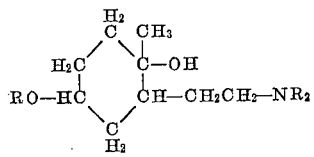

wherein the R's have the significance assigned hereinbefore. The reaction is preferably conducted at the reflux temperature of the solvent employed, and is ordinarily complete in a period of from 2 to 4 hours.

The 1-methyl-2-(β-disubstituted aminoethyl)-4-hydrocarbonoxycyclohexanol is dehydrated by means of a suitable dehydrating agent, such as potassium hydrogen sulfate, thionyl chloride in pyridine, phosphorus tribromide in pyridine, aluminium oxide with the cyclohexanol in the vapor phase, and the like, with phosphorus tribromide in pyridine being preferred. Such general procedures are known in the art and are conducted in conventional manner for such dehydrations. The product of the reaction is a 1-methyl-2-(β-disubstituted aminoethyl)-4-hydrocarbonoxycyclohexene-1 having the formula:

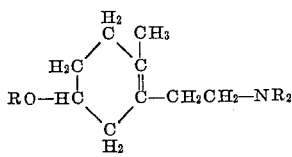

wherein the R's have the hereinbefore assigned significance. The reaction product is isolated by conventional procedure, as by dissolving in water, neutralizing with alkali, extracting with ether and subsequently distilling. The tertiary amine thus formed is subjected to a Hoffman exhaustive methylation in the next step in the process.

The tertiary amine (the foregoing 1-methyl-2-(β-disubstituted aminoethyl)-4-hydrocarbonoxycyclohexene-1) is then subjected to treatment with dimethyl sulfate followed by potassium hydroxide of approximately 50-percent weight concentration at a temperature of between approximately 100 and approximately 140 degrees centigrade, preferably at about 100 degrees centigrade. Alternatively, this step may be conducted using methyl iodide, followed by moist silver oxide within the temperature range of approximately 100 to approximately 140 degrees centigrade. Either of these two procedures is productive of a compound having the formula:

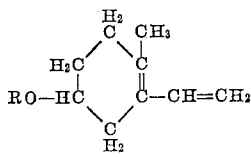

wherein R has the significance previously specified.

To produce the compounds of the present invention, the foregoing 1-methyl-2-vinyl-4-alkoxycyclohexene-1 is then reacted with maleic anhydride in the presence of hydroquinone or other polymerization inhibitor at a temperature between approximately 80 and approximately 100 degrees centigrade for a period between approximately 12 and approximately 24 hours to form an anhydride having the formula:

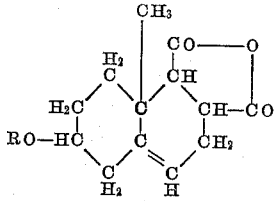

in which R has the significance hereinbefore designated. The anhydride is then hydrolyzed to the desired dibasic acid.

The following examples illustrate in greater detail the practice of this invention. It will be understood that changes and modifications may be adopted, as is obvious to those skilled in the art, without departing from the spirit or scope of the invention.

PREPARATION 1.—4-METHOXYCYCLOHEXANOL AND OTHER 4-ALKOXYCYCLOHEXANONES

A solution of 500 grams of 4-methoxyphenol (monomethyl ether of hydroquinone) in 800 milliliters of ethanol was subjected to hydrogenation in the presence of 165 grams (wet weight) of a Raney nickel catalyst prepared by the method of Adkins and Pavlic [J. Am. Chem. Soc., 68, 147 (1946)]. The initial pressure of the hydrogenation at room temperature was between approximately 1000 and approximately 1800 pounds per square inch and the final temperature was about 140 degrees centigrade. The total time required for the hydrogenation was approximately 2 to 3 hours. After removal of the catalyst and solvent, distillation of the residue gave 445 grams (85 percent) of 4-methoxycyclohexanol as a colorless liquid boiling at 104–105 degrees centigrade at a pressure of 13 millimeters of mercury.

In a like manner, 4-ethoxycyclohexanol can be obtained by the hydrogenation of 4-ethoxyphenol (ethyl ether of hydroquinone); 4-propoxycyclohexanol can be obtained from 4-propoxyphenol; 4-n-butoxycyclohexanol can be obtained from 4-n-butoxyphenol; and 4-isooctyloxycyclohexanol can be obtained from 4-isooctyloxyphenyl. These 4-alkoxyphenols (ethers of hydroquinone) can be prepared by the method described by Klarmann, Gatyas and Shternov in J. Am. Chem. Soc., 54, 298 (1932).

PREPARATION 2.—4-METHOXYCYCLOHEXANONE AND OTHER 4-ALKOXYCYCLOHEXANONES

The oxidation of 4-methoxycyclohexanol (Preparation 1) was carried out according to the procedure of Helfer [Helv. Chem. Acta., 7, 953 (1924)]. To a solution of 90 grams of potassium dichromate in 120 grams of sulfuric acid and 400 milliliters of water cooled in an ice-bath was added with vigorous stirring 58.5 grams of 4-methoxycyclohexanol. The temperature of the reaction mixture rose rapidly to 70 degrees centigrade, and the color became brown. Stirring was continued until the temperature decreased, after which the product was extracted with ether, isolated by removal of the ether and purified by distillation; it boiled at 72 degrees centigrade at a pressure of 9 millimeters of mercury.

In a like manner, 4-ethoxycyclohexanone can be obtained by the oxidation of 4-ethoxycyclohexanol; 4-propoxycyclohexanone can be obtained from 4-propoxycyclohexanol; 4-n-butoxycyclohexanone can be obtained from 4-n-butoxycyclohexanol, and 4-isooctyloxycyclohexanone can be obtained from 4-isooctyloxycyclohexanol.

PREPARATION 3.—2-CARBETHOXY-4-METHOXYCYCLOHEXANONE AND OTHER 2-CARBETHOXY-4-ALKOXYCYCLOHEXANONES

The preparation of this compound was carried out by the method heretofore described for the preparation of 2-carbethoxycyclohexanone (Snyder, Brooks and Shapiro, Organic Syntheses, Coll. volume II, John Wiley and Sons, New York, 1943, page 531; Cf. Cook and Laurence, J. Chem. Soc. 1938, 58). To a solution of 46 grams (2 moles) of sodium in 600 milliliters of absolute ethanol in an ice-salt bath was added at 10 degrees centigrade with vigorous stirring a cold solution of 256 grams (2 moles) of 4-methoxycyclohexanone (Preparation 2) in 292 grams (2 moles) of ethyl oxalate during a period of 15 to 20 minutes. The mixture was stirred at ice-bath temperature for about 1 hour and at room temperature for about 6 hours, acidified with ice-cold sulfuric acid, and extracted with benzene. After removal of the benzene on a steam-bath, about 25 grams of powdered soft glass was added to the residual 2-ethoxalyl-4-methoxycyclohexanone and the mixture was heated to 150 degrees centigrade with stirring, at a subatmospheric pressure of approximately 50 millimeters of mercury, until the evolution of carbon monoxide had ceased. Distillation of the residue gave 132.4 grams (33 percent) of 2-carbethoxy-4-methoxycyclohexanone as a heavy yellow oil which boiled at 100–105 degrees centigrade at a pressure of 1.2 millimeters of mercury.

In a like manner, 2-carbethoxy-4-ethoxycyclohexanone can be obtained by the ethoxalylation of 4-ethoxycyclohexanone followed by decarbonylation of the 2-ethoxalyl-4-ethoxycyclohexanone; 2-carbethoxy-4-propoxycyclohexanone can be obtained from 4-propoxycyclohexanone; 2-carbethoxy-4-n-butoxycyclohexanone can be obtained from 4-n-butoxycyclohexanone and 2-carbethoxy-4-isooctyloxycyclohexanone can be obtained from 4-isooctyloxycyclohexanone.

PREPARATION 4.—2-CARBETHOXY-2-(β-DIETHYLAMINOETHYL)-4-METHOXYCYCLOHEXANONE AND OTHER 2-CARBETHOXY-2-(β-DIETHYLAMINOETHYL)-4-ALKOXYCYCLOHEXANONES

A suspension of 2.3 grams (0.1 mole) of sodium sand in 200 milliliters of anhydrous toluene was added dropwise with stirring to a solution of 20.0 grams (0.1 mole) of 2-carbethoxy-4-methoxycyclohexanone (Preparation 3) in 25 milliliters of anhydrous toluene. After the addition, the mixture was heated under reflux with stirring for 3½ hours, and then stirred overnight at room temperature. The suspension of the sodio derivative was again heated to boiling and to it was added dropwise, with stirring during 3 hours, a solution of 13.6 grams (0.1 mole) of β-diethylaminoethyl chloride in 25 milliliters of anhydrous toluene. After heating under reflux for an additional 7 hours, the mixture was cooled and extracted with dilute hydrochloric acid. The acid extract was neutralized with sodium hydroxide solution, saturated with solid potassium carbonate and extracted with ether. The ether extracts were washed with water and dried, and the ether was evaporated. Distillation of the residue gave a 67 percent yield of 2-carbethoxy-2-(β-diethylaminoethyl)-4-methoxycyclohexanone as a nearly colorless liquid which boiled at 132–135 degrees centigrade at a pressure of 0.15 millimeter of mercury; $n_D^{20} = 1.4715$.

In a like manner, 2-carbethoxy-2-(β-di-n-butylaminoethyl)-4-n-butoxycyclohexanone can be obtained by the alkylation of 2-carbethoxy-4-n-butoxycyclohexanone with di-n-butylaminoethylchloride and 2-carbethoxy-2-(β-di-n-butylaminoethyl)-4-isooctyloxycyclohexanone can be obtained by alkylation of 2-carbethoxy-4-isooctyloxycyclohexanone with di-n-butylaminoethyl chloride. The di-n-butylaminoethyl chloride can be prepared according to the procedures of Barnett et al. [J. Am. Chem. Soc., 59, 2248 (1937)] and Blicke and Maxwell [ibid., 64, 428 (1942)].

PREPARATION 5.—2-(β-DIETHYLAMINOETHYL)-4-METHOXYCYCLOHEXANONE AND OTHER 2-(β-DIALKYLAMINOETHYL)-4-ALKOXYCYCLOHEXANONES

A solution of 17.0 grams (0.05 mole) of 2-carbethoxy-2-(β-diethylaminoethyl)-4-methoxycyclohexanone (Preparation 4) in 250 milliliters of 20 percent sulfuric acid was heated under reflux for 18 hours. After cooling, the solution was neutralized with sodium hydroxide, saturated with solid potassium carbonate and extracted with ether. The ether extracts were washed with water and dried, and the ether was evaporated. Distillation of the residue gave a 76 percent yield of 2-(β-diethylaminoethyl)-4-methoxycyclohexanone as a colorless oil which boiled at 112–114 degrees centigrade at a pressure of 0.8 millimeter of mercury; $n_D^{20} = 1.4680$. The product formed a crystalline salt with oxalic acid which melted at 111–112 degrees centigrade.

Analysis (Oxalate): Calculated for $C_{15}H_{27}O_6N$: C, 56.76; H, 8.58; N, 4.41. Found: C, 56.89; H, 8.58; N, 4.36.

In a like manner, 2-(β-di-n-butylaminoethyl)-4-n-butoxycyclohexanone can be obtained from 2-carbethoxy-2-(β-di-n-butylaminoethyl)-4-n-butoxycyclohexanone, and 2-(β-di-n-butylaminoethyl)-4-isooctyloxycyclohexanone can be obtained from 2-carbethoxy-2-(β-di-n-butylaminoethyl)-4-isooctyloxycyclohexanone.

PREPARATION 6.—1-METHYL-2-(β-DIETHYLAMINOETHYL)-4-METHOXYCYCLOHEXANOL-1 AND OTHER 1-METHYL-2-(β-DIALKYLAMINOETHYL)-4-ALKOXYCYCLOHEXANOLS

A solution of methyl lithium in 100 milliliters of anhydrous ether was prepared from 1.1 grams (0.16 mole) of lithium and 9.9 grams (0.07 mole) of methyl iodide. Excess lithium was removed by filtration under a nitrogen atmosphere. To the solution of methyl lithium, under a nitrogen atmosphere, was added dropwise with stirring a solution of 7.0 grams (0.034 mole) of 2-(β-diethylaminoethyl)-4-methoxycyclohexanone (Preparation 5) in 25 milliliters of anhydrous ether. When the addition was completed, the mixture was heated under reflux for two hours, cooled and poured onto ice. The ether layer was separated, and the aqueous layer, after saturation with solid potassium carbonate, was extracted with ether. The combined ether fractions were washed with water and dried, and the ether was evaporated. Distillation of the residue gave an 87 percent yield of 1-methyl-2-(β-diethylaminoethyl)-4-methoxycyclohexanol-1 as a colorless oil which boiled at 90–92 degrees centigrade at a pressure of 0.03 millimeter of mercury; $n_D^{20} = 1.4750$.

Analysis: Calculated for $C_{14}H_{29}O_2N$: C, 69.09; H, 12.01; N, 5.76. Found: C, 68.92; H, 12.48; N, 5.77.

In a like manner, 1-methyl-2-(β-di-n-butylaminoethyl) 4-n-butoxycyclohexanol-1 can be obtained from 2-(β-di-n-butylaminoethyl)-4-n-butoxycyclohexanone, and 1-methyl-2-(β-di-n-butylaminoethyl)-4-isooctyloxycyclohexanol-1 can be obtained from 1-methyl-2-(β-di-n-butylaminoethyl)-4-isooctyloxycyclohexanone.

PREPARATION 7.—1-METHYL-2-(β-DIETHYLAMINOETHYL)-4-METHOXYCYCLOHEXENE-1 AND OTHER 1-METHYL-2-(β-DIALKYLAMINOETHYL)-4-ALKOXYCYCLOHEXENES

To a solution of 12.1 grams (0.05 mole) of 1-methyl-2-(β-diethylaminoethyl)-4-methoxycyclohexanol-1 (Preparation 6) in 20 milliliters of anhydrous pyridine and 40 milliliters of anhydrous benzene maintained in an ice-bath was added dropwise with stirring a solution of 8.0 grams of phosphorus tribromide in 20 milliliters of anhydrous benzene. When the addition was complete, the orange mixture was stirred overnight at room temperature. It was poured into water, stirred until the solid material had dissolved, saturated with solid potassium carbonate, and extracted with ether. Removal of the solvents by distillation and distillation of the residue gave an 80 percent yield of 1-methyl-2-(β-diethylaminoethyl)-4-methoxycyclohexene-1 as a colorless oil which boiled at 85–87 degrees centigrade at a pressure of 0.12 millimeter of mercury; $n_D^{20} = 1.4730$. The product formed a crystalline salt with oxalic acid which melted at 111–112 degrees centigrade and a crystalline salt with methyl iodide which melted at 130–132 degrees centigrade.

Analysis (Oxalate): Calculated for $C_{16}H_{29}O_5N$: C, 60.93; H, 9.27; N, 4.44. Found: C, 60.83; H, 9.38; N, 4.70.

Analysis (Methiodide): Calculated for $C_{15}H_{30}ONI$: C, 49.04; H, 8.23. Found: C, 49.07; H, 8.03.

In a like manner, 1-methyl-2-(β-di-n-butylaminoethyl)-4-n-butoxycyclohexene-1 can be obtained from 1-methyl-2-(β-di-n-butylaminoethyl)-4-n-butoxycyclohexanol-1, and 1-methyl-2-(β-di-n-butylaminoethyl)-4-n-isooctyloxycyclohexene can be obtained from 1-methyl-2-(β-di-n-butylaminoethyl)-4-isooctyloxycyclohexanol-1.

PREPARATION 8.—HOFFMAN EXHAUSTIVE METHYLATION OF 1-METHYL-2-(β-DIETHYLAMINOETHYL)-4-METHOXYCYCLOHEXENE-1 TO PRODUCE 1-METHYL-2-VINYL-4-METHOXYCYCLOHEXENE-1 AND SIMILAR PREPARATIONS

The tertiary amine of Preparation 7 (1-methyl-2-(β-diethylaminoethyl)-4-methoxycyclohexene-1), is converted to the methiodide salt by treatment with excess methyl iodide (3 to 4 moles to each mole of the tertiary amine) in ether over a period of 24 hours. The salt is filtered, dissolved in methyl or ethyl alcohol, and refluxed for 1 hour with 1½ moles of moist silver oxide. It is thereby converted to the quaternary hydroxide.

The silver iodide is separated by filtration and, after evaporation of the filtrate, the residual quaternary hydroxide is heated to between approximately 120 and approximately 160 degrees centigrade at a subatmospheric pressure. The diene distills as decomposition occurs.

The resulting diene is taken up in ether, dried, and fractionated at a subatmospheric pressure, after evaporation of the solvent, and has a boiling point of 82 to 84 degrees centigrade at a pressure of 13 millimeters of mercury.

$$n_D^{20} = 1.5068$$

In a like manner, 1-methyl-2-vinyl-4-n-butoxycyclohexene-1 can be prepared from 1-methyl - 2 - ($\beta$ - di - n - butylaminoethyl) - 4 - n-butoxycyclohexene-1, and 1-methyl-2-vinyl-4-isooctyloxycyclohexene-1 can be prepared from 1 - methyl - 2 - ($\beta$ - di - n - butylaminoethyl) - 4 - isooctyloxycyclohexene-1.

*Example 1.—6-methoxy - 8a - methyl-1,2,3,5,6,7,- 8,8a - octahydronaphthalene - 1,2 - dicarboxylic acid*

A mixture of 15.0 grams of maleic anhydride, 5.0 grams of 1-methyl-2-vinyl-4-methoxycyclohexene-1 (Preparation 8) and 0.5 gram of hydroquinone was dissolved in 15 milliliters of freshly purified dioxane and heated under reflux for about 24 hours. The volatile components were removed at a subatmospheric pressure on a steam bath and the residue extracted with about 125 milliliters of hot water to dissolve the excess maleic anhydride. The gummy residue was then dissolved in 100 milliliters of benzene, about 50 milliliters of petroleum ether was added, and the flocculent precipitate which formed was separated by filtration. The clarified organic solution was heated on a steam bath to remove the solvents and the residue was dissolved in 125 milliliters of water which contained 25 grams of potassium hydroxide. The alkaline solution was then acidified with concentrated sulfuric acid and heated on a steam bath for about 2 hours, which caused some polymeric material to coagulate so that it could be removed by decantation. The supernatant liquid was then heated at a subatmospheric pressure on a steam bath to remove the solvent and the residue was dissolved in about 100 milliliters of water, to which about 5 milliliters of ethanol had been added. After the aqueous alcohol solution had stood in a refrigerator for about 9 days, the crystals which formed were filtered off and recrystallized from aqueous alcohol and dried to obtain 1.66 grams of 6-methoxy-8a-methyl-1,2,3, 5,6,7,8,8a - octahydronaphthalene - 1,2 - dicarboxylic acid which melted at 175 to 177 degrees centigrade.

*Other examples*

In a manner similar to that described in Example 1 hereinbefore, 6-n-butoxy-8a-methyl-1,2,3,5,6,7,8,8a - octahydronaphthalene - 1,2 - dicarboxylic acid can be prepared from maleic anhydride and 1-methyl-2-vinyl-4-n-butoxycyclohexene-1 (Preparation 8), and 6-isooctyloxy-8a-methyl - 1,2,3,5,6,7,8,8a - octahydronaphthalene-1,2-dicarboxylic acid can be prepared from maleic anhydride and 1-methyl-2-vinyl-4-isooctyloxycyclohexene-1 (Preparation 8).

It is to be understood that the invention is not to be limited to the exact details of operation or exact compounds shown and described, inasmuch as obvious modifications and equivalents will be apparent to those skilled in the art, and the invention is therefore to be limited only by the scope of the appended claims.

We claim:
1. A 6-lower alkoxy -8a-methyl-1,2,3,5,6,7,8,8a-octahydronaphthalene - 1,2 - dicarboxylic acid having the formula:

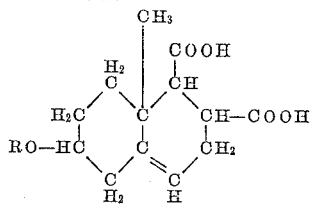

wherein R is a saturated aliphatic hydrocarbon radical containing up to and including eight carbon atoms.

2. 6 - methoxy - 8a - methyl - 1,2,3,5,6,7,8,8a-octahydronaphthalene - 1,2 - dicarboxylic acid.

3. 6 - n - butoxy - 8a - methyl - 1,2,3,5,6,7,8,8a-octahydronaphthalene - 1,2 - dicarboxylic acid.

4. 6 - isooctyloxy - 8a - methyl - 1,2,3,5,7,8,8a-octahydronaphthalene - 1,2 - dicarboxylic acid.

5. The process which comprises: condensing maleic anhydride with 1-methyl-2-vinyl-4-lower alkoxycyclohexene in an inert organic diluent containing a polymerization inhibitor at a temperature between approximately eighty and approximately 120 degrees centigrade.

6. A process for the production of 6-lower alkoxy - 8a - methyl - 1,2,3,5,6,7,8,8a - octahydronaphthalene-1,2-dicarboxylic acid which comprises: condensing maleic anhydride with 1-methyl-2-vinyl-4-lower alkoxycyclohexene - 1 in an inert organic diluent containing a polymerization inhibitor at a temperature between approximately eighty degrees and approximately 100 degrees centigrade; saponifying the thus-produced octahydronaphthalene - 1,2 - dicarboxylic acid anhydride with aqueous alkali; acidifying the saponified mixture and recovering the thus-produced 6-lower alkoxy-8a-methyl-1,2,3,5,6,7,8, 8a-octahydronaphthalene-1,2 - dicarboxylic acid.

7. A process for the production of 6-methoxy-8a-methyl-1,2,3,5,6,7,8,8a-octahydronaphthalene-1,2-dicarboxylic acid which comprises: condensing maleic anhydride with 1-methyl-2-vinyl-4-methoxycyclohexene-1 in a solution of dioxane containing hydroquinone at a temperature of approximately 100 degrees centigrade; removing the dioxane and extracting the residue with water to dissolve any maleic anhydride; saponifying the thus-obtained crude 6-methoxy-8a-methyl-1,2,3, 5,6,7,8,8a-octahydronaphthalene - 1,2 - dicarboxylic acid anhydride with aqueous alkali; acidifying the alkaline solution and recovering the thus-produced 6 - methoxy-8a-methyl-1,2,3,5,6,7,8,8a-octahydronaphthalene-1,2-dicarboxylic acid.

8. The process of claim 6 wherein the maleic anhydride is employed in a molar excess calculated on the starting 1-methyl-2-vinyl-4-lower-alkoxycyclohexene-1.

9. The process of claim 7 wherein the maleic anhydride is employed in a molar excess calculated on the starting 1-methyl-2-vinyl-4-methoxycyclohexene-1.

References Cited in the file of this patent
UNITED STATES PATENTS

| Number | Name | Date |
|---|---|---|
| 2,260,085 | Milas et al. | Oct. 21, 1941 |
| 2,499,247 | Jacobsen et al. | Feb. 28, 1950 |
| 2,534,466 | Miescher et al. | Dec. 19, 1950 |

OTHER REFERENCES

Meggy et al., Nature, vol. 140, page 282 (1937).